(12) United States Patent
Reynolds

(10) Patent No.: US 7,109,414 B2
(45) Date of Patent: Sep. 19, 2006

(54) ELECTRICAL BOX STRADDLING A CONSTRUCTION STUD

(76) Inventor: Paul Reynolds, P.O. Box 575, Washington, UT (US) 84780

( * ) Notice: Subject to any disclaimer, the term of this patent is extended or adjusted under 35 U.S.C. 154(b) by 104 days.

(21) Appl. No.: 10/986,725

(22) Filed: Nov. 12, 2004

(65) Prior Publication Data

US 2006/0102371 A1 May 18, 2006

(51) Int. Cl.
*H02G 3/08* (2006.01)
(52) U.S. Cl. .............. 174/50; 174/48; 174/53; 174/58; 220/3.2; 220/3.3; 248/906
(58) Field of Classification Search .............. 174/48, 174/50, 53, 57, 58, 54, 61, 17 R; 220/3.2, 220/3.3, 3.4, 3.5, 3.6, 3.7, 3.8, 3.9, 4.02, 220/231.9; 248/906, 343, 231.9; D13/152
See application file for complete search history.

(56) References Cited

U.S. PATENT DOCUMENTS

| | | | | |
|---|---|---|---|---|
| 4,062,470 A | * | 12/1977 | Boteler | 220/3.3 |
| 4,135,337 A | * | 1/1979 | Medlin | 220/3.3 |
| 4,572,391 A | * | 2/1986 | Medlin | 220/3.9 |
| 5,025,944 A | * | 6/1991 | Rodick | 220/3.9 |
| 5,191,171 A | * | 3/1993 | Bordwell | 174/65 R |
| 5,289,934 A | * | 3/1994 | Smith et al. | 220/3.7 |
| 5,841,068 A | * | 11/1998 | Umstead et al. | 174/58 |
| D408,015 S | * | 4/1999 | Faucher | D13/152 |
| 5,965,844 A | * | 10/1999 | Lippa | 174/49 |
| 6,147,304 A | * | 11/2000 | Doherty | 174/48 |
| 6,573,446 B1 | * | 6/2003 | Umstead et al. | 174/50 |
| 6,749,162 B1 | * | 6/2004 | Nicolides et al. | 248/231.9 |

* cited by examiner

*Primary Examiner*—Angel R. Estrada
(74) *Attorney, Agent, or Firm*—M. Reid Russell

(57) ABSTRACT

An electrical straddle box that includes a pair of electrical boxes sized to fit between construction studs and are joined alongside one another by a U shaped saddle, where the saddle legs are the opposing sides of the electrical boxes, and the saddle web is the width of, and is for fastening to, a center construction stud. Each electrical box includes a removable back panel with spaced holes therein for use in mounting low voltage components, distribution modules such as connector bars or strips, and wiring, and includes a hinge connected cover for fitting over both the electrical boxes.

9 Claims, 4 Drawing Sheets

ELECTRICAL BOX STRADDLING A CONSTRUCTION STUD

BACKGROUND OF THE INVENTION

1. Field of the Invention

The present invention pertains to electrical wall boxes installed in new construction and remodeling that are dedicated to low voltage wiring systems, including Category (CAT) UPT cables, Coaxial CATV/MATV/CCTV Serial Digital, Computer Network (LAN), and low voltage control and speaker cables, encompassing telephone, computer, internet, video, low voltage lighting, and the like.

2. Prior Art

Electrical wall boxes that provide for conduit junctions to route both high and low power throughout a building are, of course, well known. Such earlier junction boxes were primarily provided for reducing incoming voltage 220 and 110 volts and routing same through circuit breakers to wall receptacles, and other power couplers through a building. Electrical cables carrying such power has generally been passed through conduits, with the conduits connected between the circuit breaker panel and individual outlet boxes, providing a hard metal or plastic covering to the electrical wiring. In recent times a proliferation of low voltage needs have come into play. Particularly in new construction it is common to run Category (CAT) UPT Cables, Coaxial CATV/MATV/CCTV/Serial Digital, Computer Network (LAN), and low voltage control and speaker cables to every room to provide telephone, cable TV, computer to multiple outlet boxes in the same room. Additionally, it is also common to provide for connection of light switches to be operated by a low voltage system. All in all, there has been an explosion in both wiring for house current and low voltage. Where it is common to position a breaker box for house current proximate to the rooms or appliances it serves, it is preferred to locate a box or boxes in a central location for all low voltage needs. To this end, the invention provides a pair of electrical boxes joined at a saddle that is to fit over a center construction stud, with the boxes to each fit in the spaces between the adjacent construction studs that can receive fasteners through the box sides passed into the stud sides. The pair of boxes are supported by nailing or screwing the saddle onto the stud, providing a rigid mounting at a center stud that, with the boxes held fast to the center stud, is further reinforced by passing fasteners through the box sides walls or plates and into the adjacent studs. Which boxes mounting is therefore substantially easier to effect than is a mounting of a single box where, with the box supported by one person, a second person has to pass fasteners through the box sides into adjacent studs. Which straddle box arrangement, additionally, allows for a use of a single cover to fit over both boxes, providing a greater range of access into the content of both boxes.

SUMMARY OF THE INVENTION

The invention is in a pair of electrical boxes straddling a construction stud in new construction and remodeling, to provide a pair of side by side electrical boxes primarily for containing low voltage distribution modules such as, connector blocks or strips, and wires. The electrical box of the invention is two electrical boxes joined at their opposing ends by a saddle that is sized to fit over a standard width of construction stud. So arranged, the boxes on opposite sides of the saddle fit into the areas between a center and side construction studs, providing a flush mount of the individual electrical boxes in a wall. The saddle has vertical spaced holes formed along the center of the saddle web and through the boxes outer side plates or walls that fasteners, such as screws or nails, are passed through, into the center and adjacent studs, and a saddle cabling guard is fitted to the saddle ends allowing cables to be passed between boxes, across the saddle and under the cabling guard. The individual electrical boxes are arranged with corner mounting tabs that each have a threaded hole for receiving a bolt turned there through that is turned through a corner and mid points of a single cover that spans the boxes and contacts the top of the saddle cabling guard. Alternatively, two covers can be used to each cover one of the boxes rather than the one cover. Back panels are provided for each box having columns or lines of spaced vertical and horizontal holes formed along the sides and center of each back panel that are for mounting low voltage components and connector blocks or strips contained in the boxes.

It is a principal object of the present invention to provide a pair of electrical boxes that are connected in side by side relationship by a saddle that is formed to straddle a construction stud, with the electrical boxes for fitting between adjacent construction studs.

Another object of the present invention is to provide a pair of electrical boxes joined in side by side relationship to a saddle with the assembly to fit across three construction studs, with the saddle and boxes side walls or plates receiving fasteners, such as screws or nails, there through that mount the saddle to a center and adjacent construction studs, supporting the pair of electrical boxes that fit between the adjacent construction studs.

Another object of the present invention is to provide removable back panels for each electrical box for mounting to the box rear surface that provide multiple spaced mounting holes for receiving connectors, mounting low voltage components and connector blocks or strips.

Still another object of the present invention is to provide a pair of electrical boxes arranged as a single straddle box for quick and easy installation into a framed wall, supporting a large number of low voltage components, connector blocks or strips, and wires, that is easily accessible through a single cover, and allows cabling to be passed from one box to the other over, or in front of, the saddle the connects the boxes across a construction stud, but under a saddle cabling guard.

BRIEF DESCRIPTION OF THE DRAWINGS

These and other objects and features of the present invention will become more apparent from the following description in which the invention is described in detail in conjunction with the accompanying drawings.

DETAILED DESCRIPTION

Figure 1:
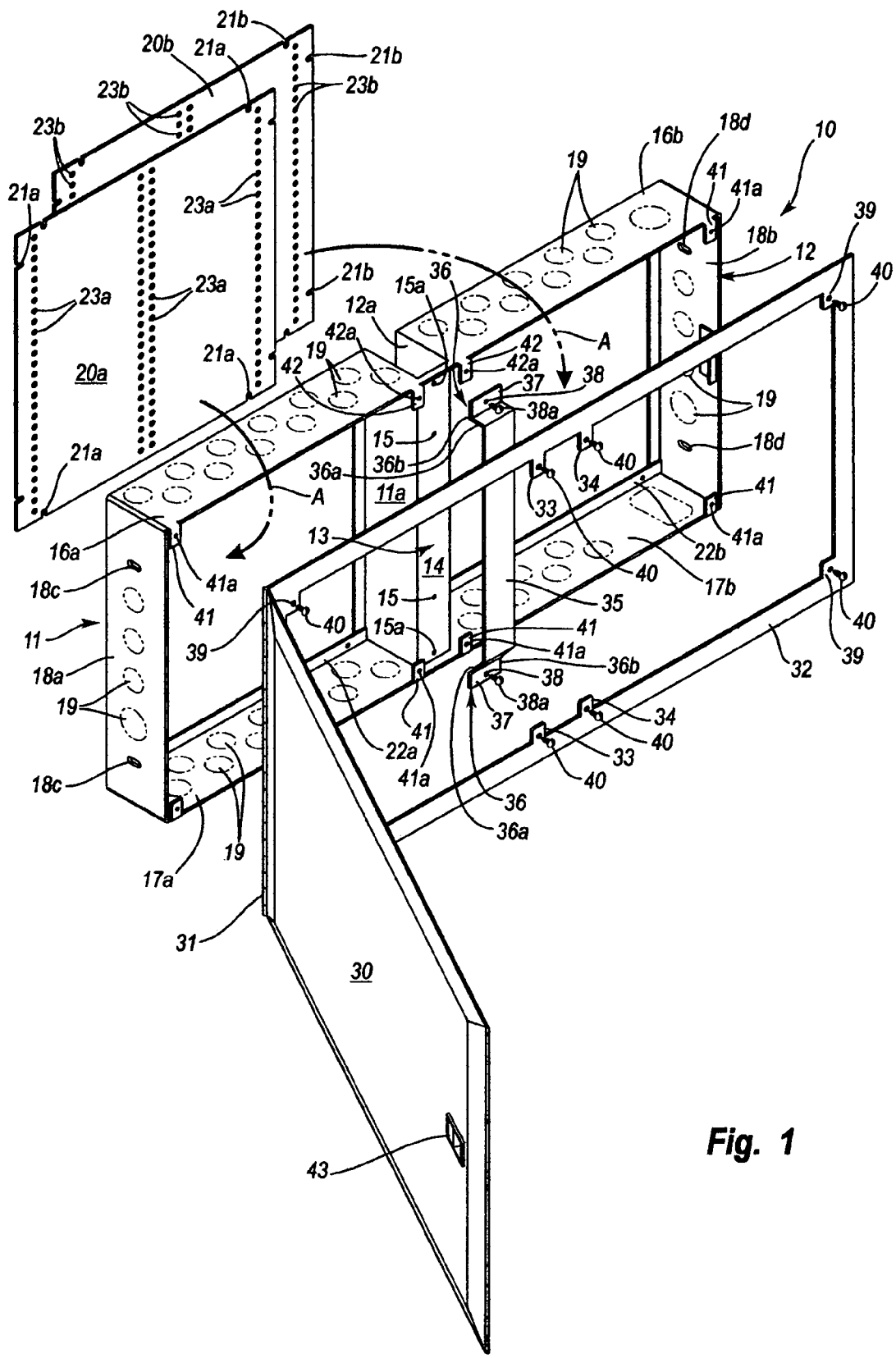
FIG. 1 is a top frontal exploded perspective view of a straddle box of the invention with arrows A illustrating the fitting of removable back panel plates into each of the joined pair of electrical boxes.

The invention, as is hereinafter described, relates to electrical boxes that are particularly suited for containing low voltage components, distribution modules or connector blocks and strips, and wiring, and are for installation during construction or remodeling between wall construction studs. The invention, shown in FIG. 1, is in a straddle box 10 consisting of a pair of left and right electrical boxes 11 and 12 that are shown as being essentially like electrical boxes that will each fit between construction studs that are spaced apart a standard construction stud spacing distance of approximately seventeen inches. Though, it should be understood, the electrical boxes 111 and 12 could be any appropriate width to fit between construction studs as are actually installed in a wall. The electrical boxes 11 and 12 can be formed separately to have opposing sides 11a and 12a that are to fit against opposite sides of a construction stud and are joined along their top edges to a web 14 that is of a width of a standard construction stud, forming a U shaped saddle 13, as shown in FIG. 1. Alternatively, the electrical boxes 11 and 12 can be formed separately with their sides 11a and 12a mounted onto parallel legs of the saddle 13 that are spaced a stud width distance apart by the web 14. Accordingly, it should be understood, while FIG. 1 shows the U shaped saddle 13 as including parallel legs 11a and 12a joined by web 14, with saddle sides also being the sides 11a and 12a of electrical boxes 11 and 12, the saddle 13 can be formed separately for joining to the electrical box sides 11a and 12a, within the scope of this disclosure.

Figure 2:
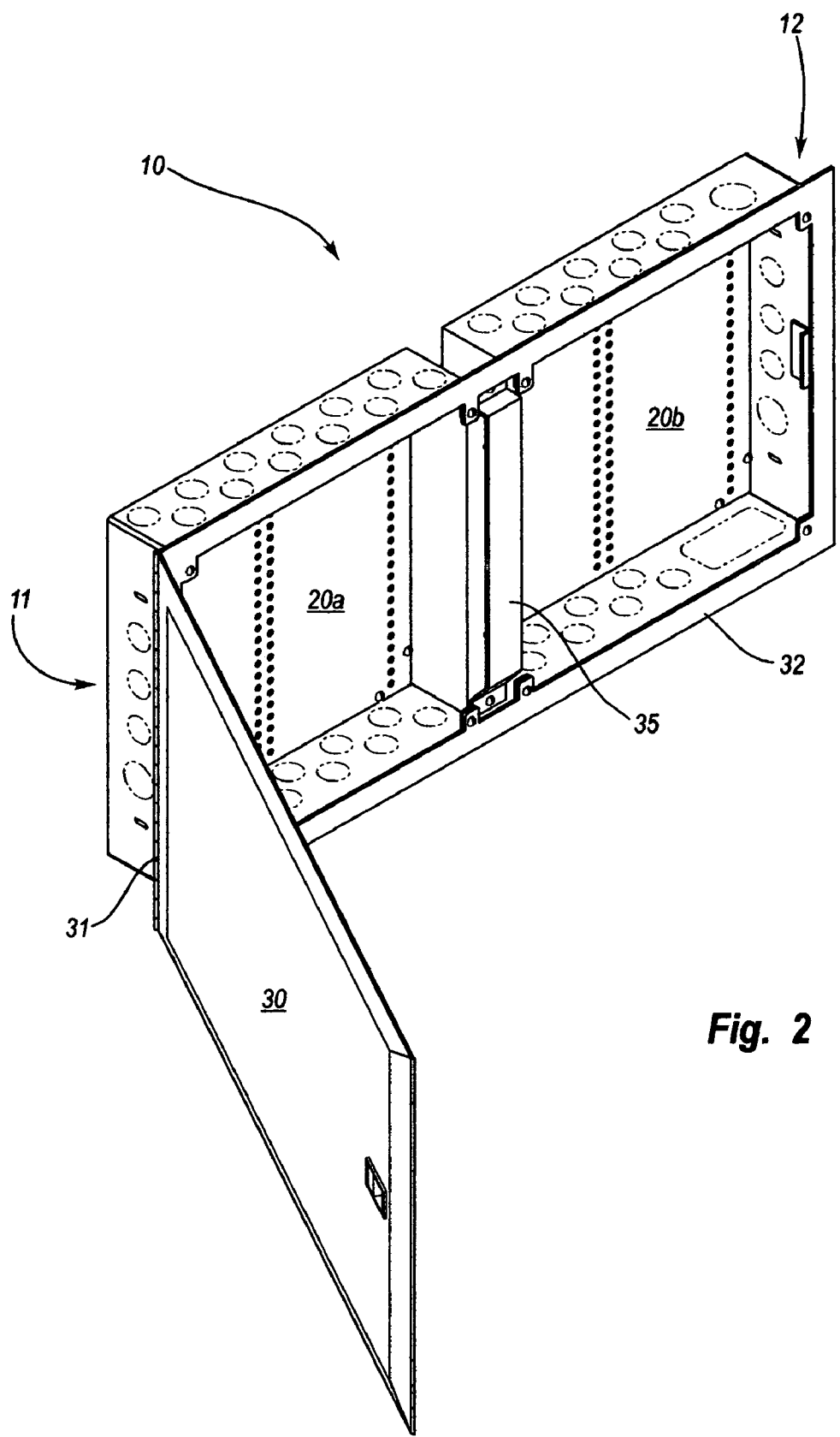
FIG. 2 shows an assembled view of the straddle box of FIG. 1, showing the front panel as hinge connected to an outer edge of a left electrical box and is shown open.
Figure 3:
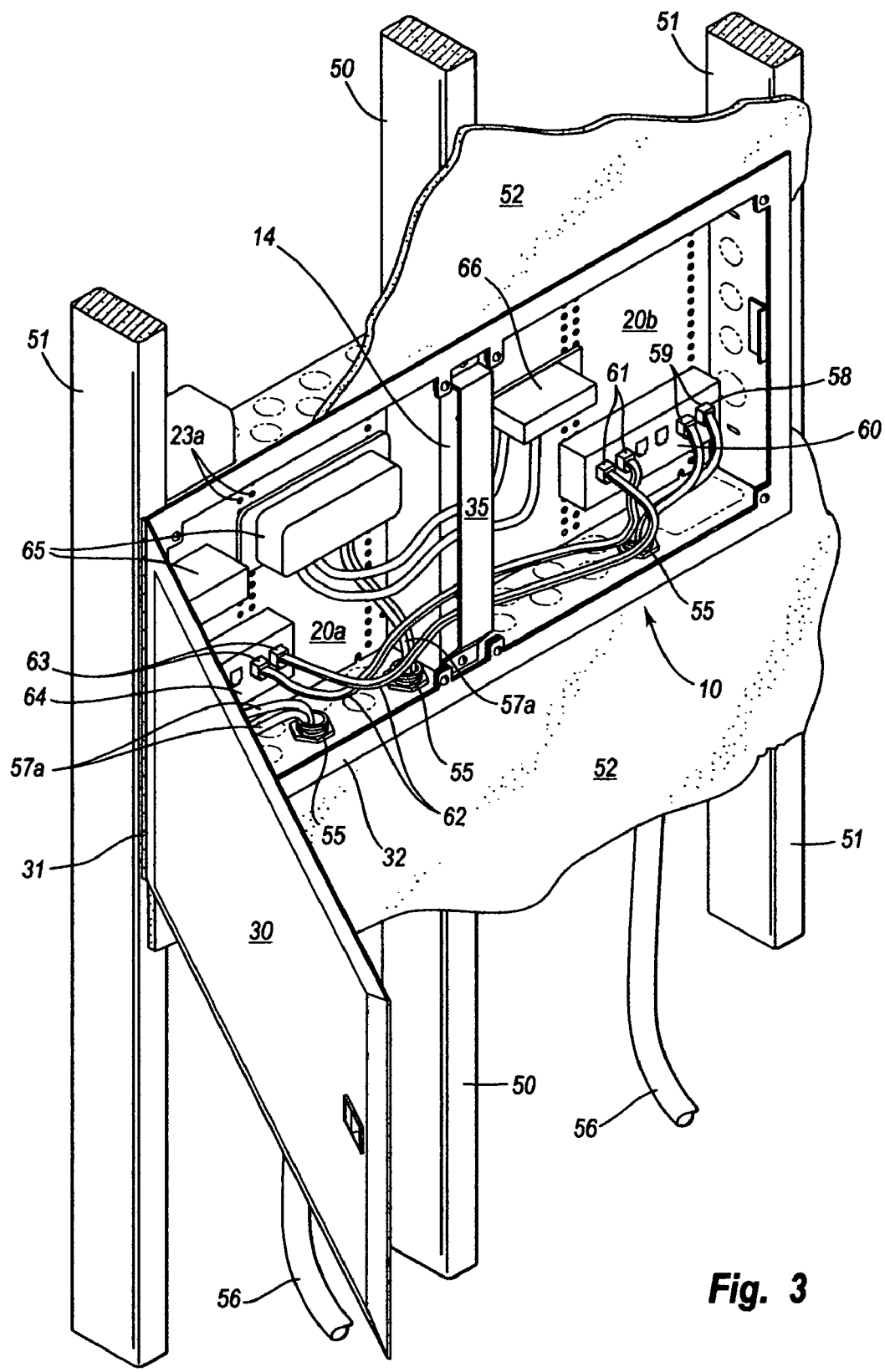
FIG. 3 shows the straddle box of FIG. 2 mounted onto a center construction stud, between adjacent construction studs, and showing the interior of the electrical boxes as having received low voltage components, distribution modules or connector blocks and strips, and with wires shown entering the boxes from conduits and connected therein.

The web 14 of the saddle 13 includes holes 15 formed through spaced points along the web vertical axis that are for receiving fasteners, such as screws, nails, or the like, for mounting the straddle box 10 of FIG. 1 onto a center construction stud 50, as shown in FIG. 3. With the boxes 111 and 12 sides or plates 18a and 18b each including spaced holes 18c and 18d, respectively, that can receive fasteners, such as screw, nails, or the like, passed therethrough and into the adjacent studs 51, shown in FIG. 3. The electrical boxes 11 and 12 are shown in FIG. 1 as having top panels 16a and 16b, bottom panels 17a and 17b, and the outer sides 18a and 18b that each have a number of "knock outs" 19, that can be of like or different diameters, can be other than round in shape, and are for providing holes for receiving conduit ends 55 fitted thereto, as shown in FIG. 3, and discussed below. The electrical boxes 11 and 12 each receive a removable back panel 20a and 20b fitted therein, as illustrated by arrows A in FIG. 1. The removable back panels are each maintained to the back of the electrical box by fitting fasteners, such as screws or bolts through corner hole segments 21a and 21b that are formed in the removable back panels 20a and 20b corners, and are turned into holes 22a and 22b formed in electrical boxes 11 and 12, respectively. Which removable back panels 20a and 20b, as shown in FIGS. 1 and 2, each include vertical rows of spaced holes 23a and 23b and can have holes formed between which rows that are for mounting low voltage components, distribution modules such as connector bars or strips, and the like, as shown in FIG. 3.

Additionally, as shown in FIG. 1, the saddle box 10 is provided with a cover 30, that is shown as a thin rectangular member that is raised across its center, and is connected by a hinge 31 to an end of an open rectangular cover frame 32 that includes corner and center tabs 33 and 34, respectively. Which center tabs 34 are spaced a distance apart to accommodate ends 36 of a bar 35 that are fitted there between. The bar 35 ends 36 are bent inwardly and outwardly at 36a and 36b, respectively, in a dog-leg bend, forming an outer flat tab 37 that has a center hole 38 that a screw 38a is aligned with to fit through. Which screws 38a, that are fitted through center holes 38, are each for turning in an end hole 15a that is formed through a top and bottom portion, respectively, of the saddle web 14. So arranged, the bar 35 is mounted to the saddle web 14 so as to provide an opening across the saddle web 14 that allows for passage of cables and wiring to be passed from one electrical box to the other, and provides a center vertical support to a mid-section of the cover 30. The open rectangular cover frame 32, whereto the cover 30 is hinged at 31, is fitted onto the electrical boxes 11 and 12 with screws 40 that are turned through holes 39 that are formed through the tabs 33 and 34, and are turned into holes 41a and 42a of electrical box corners and center tabs 41 and 42, respectively. With the cover frame 32 mounted over the electrical boxes 11 and 12, spanning the saddle web 14, the cover can be closed and held in place by operation of a standard cover latch 43.

FIG. 2 shows the electrical boxes 11 and 12, with the removable back panels 20a and 20b fitted therein. The saddle 13 is shown arranged between the electrical boxes where over the bar 35 is installed. The cover frame 32 is mounted across the electrical boxes and with the cover 30 connected by hinge 31 to the cover frame. The straddle box 10 is thereby configured to mount to a middle construction stud 50, with the electrical boxes 11 and 12 fitting in the spaces between adjacent construction studs 51, as shown in FIG. 3.

FIG. 3 shows the straddle box 10 of FIG. 2 mounted at saddle 13 to center construction stud 50 and fitted between outside construction studs 51, and showing sheet rock 52 as having been connected to the studs, around the straddle box 10. As shown in FIG. 3, several of the "knock outs" 19 have been removed and electrical fittings 55 have been installed in which "knock out" holes and are connect to conduits 56 where through wires 57a and 57b have been passed. Ends 58 of the wires 57b are shown as having telephone jack connectors 59 secured onto their ends that fit into female couplers of a telephone jack bar 60. Which telephone jack bar 60 also has jack connectors 61 fitted therein that are secured onto ends of wires 62 that have been passed under the bar 35 above the saddle web 14. The opposite ends of wires 62 are shown as also including jack connectors 63 that are fitted into female couplers of a second telephone jack bar 64, electrically connecting the two telephone jack bars 60 and 64. Which arrangement is an an example of low voltage wiring and distribution modules, shown as connecting stripe and bars, as the invention accommodates, that are mounted in the spaced holes 23a and 23b. Further low voltage components 65 and 66 are shown as also mounted in spaced holes 23a and 23b that are linked by wires 67 that are also passed under the bar 37, above the saddle web 14, demonstrating that the holes 23a pattern in the removable back panels 20a and 20b can be varied to accommodate various manufacturer's modules designs.

Figure 4:
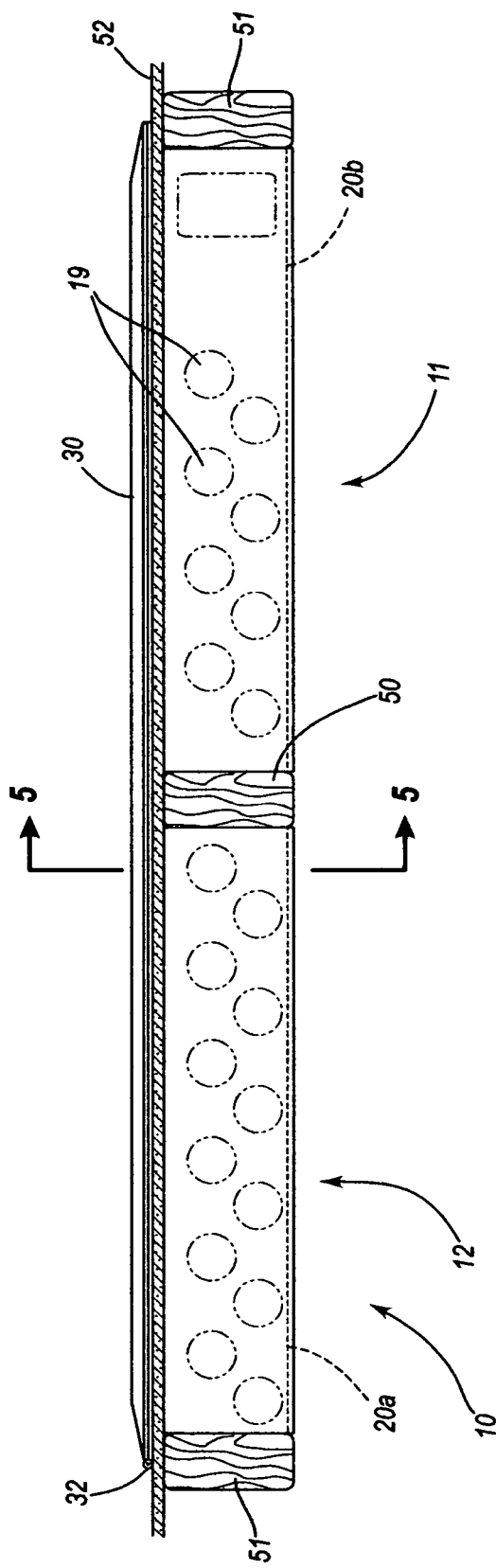
FIG. 4 is a top plan view of the straddle box of FIG. 3.
Figure 5:
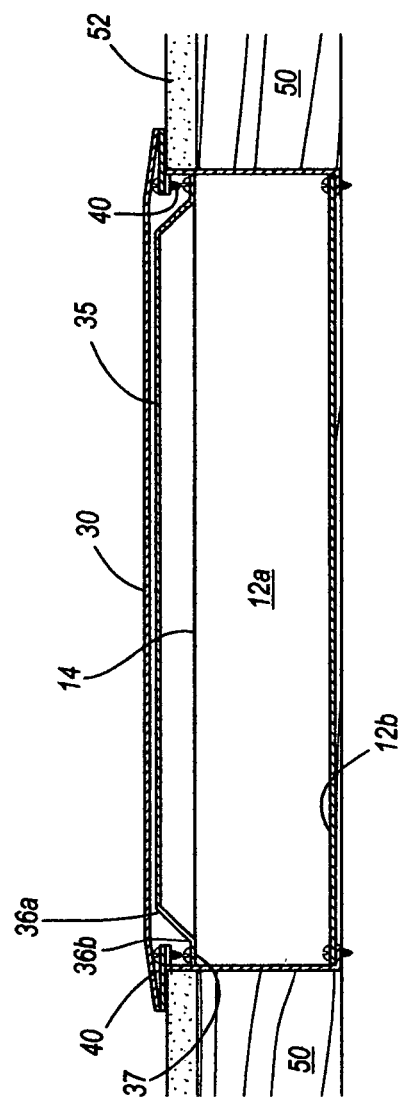
FIG. 5 is an end sectional view taken along the line 5—5 of FIG. 4.

A top plan view of the straddle box 10 is shown in FIG. 3 taken from rear to front, illustrating how the straddle box electrical boxes 11 and 12 fit snugly between the construction studs 50 and 51 and illustrating that the electrical box top and bottom ends have a number of "knock outs" 19 formed therein, as well as larger size "knock outs" 19a, that are to provide for receiving a large number of conduit coupling ends to contain a large number of low voltage modules, components and wiring. FIG. 5 is a side elevation sectional view taken along the line 5—5 of FIG. 4, showing the saddle side wall 12a and the saddle web 14 as fitting closely onto the center constructional stud 50 and showing the cover as closely fitting to the bar 30, with a gap left between the bar 30 and saddle web 14 to accommodate cables and/or wires passed from one electrical box to the other.

Hereinabove has been set out a description of a preferred embodiment of the electrical box straddling a construction stud, or straddle box of the invention and its use. It should however, be understood that the present invention can be varied within the scope of this disclosure without departing from the subject matter coming within the scope of the following claims, and a reasonable equivalency thereof, which claims I regard as my invention.

I claim:

1. An electrical straddle box comprising, a pair of rectangular electrical boxes each having a width to fit between adjacent construction studs, and said electrical boxes are separated from each other by a center construction stud; a U-shaped saddle whose legs are adjacent inner ends of each of said pair of electrical boxes and including a web member of a width to fit over said center construction stud; means for attachment of said U-shaped saddle web to an outer edge across the width of said center construction stud to position each of said pair of electrical boxes fitted in an area between said center construction stud and an adjacent construction stud for providing a flush mounting of said straddle box across said adjacent and center construction studs; and a cover arranged to fit over, and be secured across, the pair of rectangular electrical boxes and saddle, and said cover is hinge connected to an outer top edge of the outer side of one of said electrical boxes to swing outwardly, exposing the interiors of both of said electrical boxes.

2. The electrical straddle box as recited in claim 1, further including a straight bar having dog leg bends in its opposite ends, said straight bar having a length and width to fit over and extend the length of the saddle web, to be spaced a distance above said saddle web so as to provide a passage of cables and wires across said saddle web, beneath said straight bar.

3. The electrical straddle box as recited in claim 1, further including a pair of thin rectangular removable back panels, with said back panels having dimensions to, and are for fitting in, each of the pair of electrical boxes and for mounting onto the back of each said pair of electrical boxes, and each said back panel has a plurality of spaced holes formed therein.

4. The electrical straddle box as recited in claim 1, wherein the top, bottom and outer sides of each of the electrical boxes includes a plurality of spaced knock outs that are removable to form holes therethrough.

5. The electrical straddle box as recited in claim 4, wherein some of the knock outs have greater or less diameters than one another and can have other than round shapes.

6. An electrical straddle box comprising, a pair of rectangular electrical boxes each having a width to fit between adjacent construction studs, and said electrical boxes are separated from each other by a center construction stud; a U-shaped saddle whose legs are adjacent inner ends of each of said pair of electrical boxes and including a web member of a width to fit over said center construction stud; means for attachment of said U-shaped saddle web to an outer edge across the width of said center construction stud to position each of said pair of electrical boxes fitted in an area between said center construction stud and an adjacent construction stud for providing a flush mounting of said straddle box across said adjacent and center construction studs; a cover arranged to fit over, and be secured across, the pair of rectangular electrical boxes and saddle; and a straight bar having dog led bends in its opposite ends, with said straight bar having a length and width to fit over and extend the length of said saddle web, to be spaced a distance above said saddle web so as to provide a passage of cables and wires across said saddle web, beneath said straight bar.

7. The electrical straddle box as recited in claim 6, further including a pair of thin rectangular removable back panels, with said back panels having dimensions to, and are for fitting in, each of the pair of electrical boxes and for mounting onto the back of each said pair of electrical boxes, and each said back panel has a plurality of spaced holes formed therein.

8. The electrical straddle box as recited in claim 7, wherein the top, bottom and outer sides of each of the electrical boxes includes a plurality of spaced knock outs that are removable to form holes therethrough.

9. The electrical straddle box as recited in claim 8, wherein some of the knock outs have greater or less diameters than one another and can have other than round shapes.

\* \* \* \* \*